C. MURDOCK.
Stave Machine.
No. 84,897.
Patented Dec. 15, 1868.
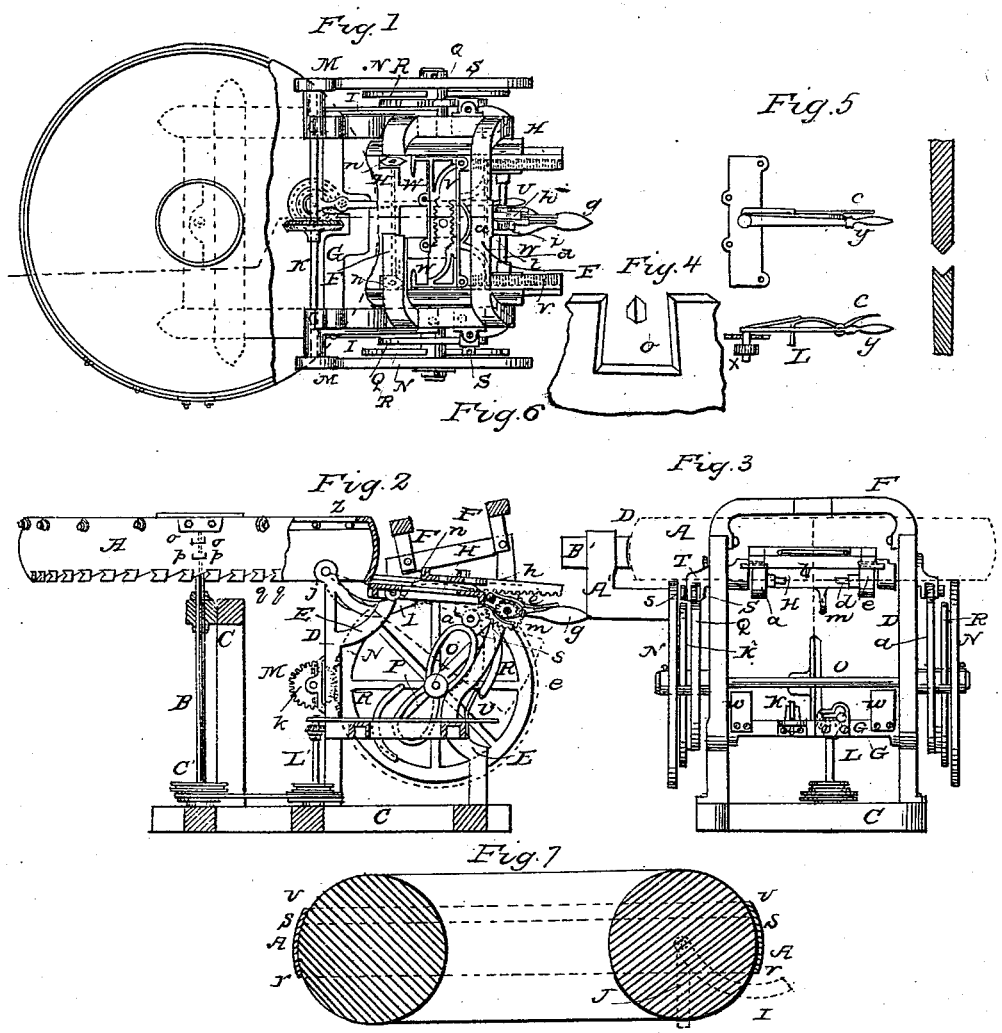

UNITED STATES PATENT OFFICE.

CHARLES MURDOCK, OF HARTFORD, CONNECTICUT.

Letters Patent No. 84,897, dated December 15, 1868.

IMPROVEMENT IN STAVE-MACHINE.

The Schedule referred to in these Letters Patent and making part of the same.

*To all whom it may concern:*

Be it known that I, CHARLES MURDOCK, of Hartford, Hartford county, in the State of Connecticut, have invented certain new and useful Improvements in Machines for Sawing Staves; and I hereby declare the following to be a full and exact description thereof.

My invention relates to certain new and useful improvements on the stave-sawing machine patented to me on the 19th day of June, 1866, numbered 55,695; and It consists in pivoting the reciprocating vibratory table, with its head-block, at a point within the diameter of the saw, that will cause the saw to cut a transverse circle on the outside of the stave, to conform to the outside diameter of the barrel or cask when completed; and It further consists in the means used for imparting a vibratory motion to the table, and the combination of such devices with other devices, for feeding the block to the saw at each reciprocation or vibration of the carriage or table that supports the block, and determines the thickness of the stave.

In order that my improvement may be fully understood, it is necessary to describe the entire machine, and refer to the accompanying drawings, which form a part of this specification, of which—

Figure 1 is a plan or top view of the machine.

Figure 2, a sectional view of the machine on line z z of fig. 1.

Figure 3, a front elevation.

Figures 4, 5, and 6 are sections of different parts of the machine or its devices.

Figure 7 is a cross-section of the saw, and the relative position of the pivoted point of the arm of the vibrating table with the saw.

The saw A is mounted on the shaft B, turning in boxes on the main frame C, the driving-power being applied by a band on the pulley C', or otherwise.

Upon the frame C a side frame, D, is fastened, consisting of the four bent posts E, connected at the top by the rails F F, and below by the cross-bars G.

Within the frame D, the feeding-frame or table H is arranged to vibrate, having its arms I I pivoted in the stands J J on the frame D.

In order that the movements of that part of the table H beneath or next to the saw may correspond, as nearly as possible, to the transverse curvature of the saw on its outer diameter, and give such a movement to the block that the saw will cut the transverse curvature of the stave to correspond with the circle of the barrel at the bilge, the pivots in the arms I I should be so arranged that a straight line passing through them, or, in other words, the axial line upon which the table H vibrates, shall pass through the centre of the transverse curvature of the saw at the point in it directly opposite to the middle of the table H, the two pivots being equally distant from said centre.

The shaft K turns in boxes on the frame D, and is driven by a gear on the vertical shaft L, which is connected with the shaft B by a band and pulleys.

On the shaft K are fastened the gears M M, driving the gears N N on the shaft O, which turns in boxes in the stands P P on the cross-bars of the frame D.

Fastened on the shaft O, or to the gears N N, or to both, are the cams Q Q, and also the flanges R R, which act against the projections or rollers S S on the arms T T of the feeding-table H, and vibrate, or raise and lower the same, as required in the working of the machine.

The hand-lever U, pivoted on a yoke in the cross-bar G, enables the operator to disengage the gear on the shaft L, and allow the movements of the table H to stop.

On the table H is a carriage, V, traversing towards and from the saw A, in ways or guides on the sides of the table, and having on or within it the holding-dogs W W, provided with racks, operated by the pinion X, turned by the hand-lever Y, which is held by the pawl Z, taking the rack a, or raised, when required, by pressure on the arm c.

The shaft d turns in boxes on the table H, and the ratchet-wheel, f, on this shaft is operated by the lever g and pawl h, and is held by the locking-pawl i, which projects over the pawl h, so that both pawls may be raised together by the small lever j, pivoted on the lever g.

As often as the front of the vibrating table H descends, the lever g is raised by the stand k upon the frame D, and the ratchet f advanced one tooth, or more, and an arm, l, projecting from the table H, acts as a stop, to arrest the motion of the lever g, when raised by hand.

The pinions e e, on the shaft d, operate racks on the under side of the carriage V, to traverse it on the table H.

Operation.

A block having been prepared, by sawing or otherwise, so as to have a length equal to that of the stave to be formed, and a thickness corresponding to the desired width of the stave, it is laid flat upon the carriage V, and its ends secured by the dogs W W. The shaft B being then started, and the connected machinery set in motion, each semi-revolution of the gears N N (or each revolution, if there be but one cam on each gear) will raise and carry down the vibrating table H by means of the cams Q and the flanges R, and, as often as it is lifted, it raises the block on the carriage V, to meet and be cut by the saw A; and, as often as it descends, and the lever g meets and is lifted by the stand k, the pawl h turns the ratchet f, and advances the carriage V and block by a space equal to the thickness of a stave added to the width of the space cut out by the saw; and, when the table H is again raised, the saw will consequently reach over the block, and cut off another stave.

The lever $g$ is weighted, so as to draw back the pawl $h$, when it is lifted from the stand $k$, by the rising of the table, the fall of the lever being arrested by the adjustable stop, $m$, on an arm projecting from the table H, so that, if desired, the lever may be allowed to fall far enough to carry the pawl $h$ over two or more of the teeth of the ratchet $f$ at a time, and, the height of the stand $k$, which is also adjustable, being changed, so as to lift the lever $g$, and advance the ratchet proportionately, the length of the steps by which the carriage V advances may be doubled, trebled, &c., and staves cut of a corresponding thickness.

For cutting staves of any intermediate thickness, the ratchet $f$ is replaced by one having teeth at such intervals as the desired thickness of stave may require.

When the cutting of a block has been completed, the gear on the shaft L may be disengaged by the lever U, and the movements of the table H allowed to stop. The lever $g$ is then to be raised by the operator, if not already raised by the stand $k$, and the lever $j$ pressed down, to lift the two pawls $h$ and $i$ clear of the ratchet $f$, when the carriage may be run back, and a new block placed upon it, as before.

The racks beneath the carriage are made of such extent that they will, when operated by the pinions $e\ e$, only carry the carriage close up to the saw A, but will not bring it in contact with the saw; and the backward or downward motion of the carriage, when allowed to run back, may be checked by springs or cushions, to prevent a violent concussion.

The stops $w\ w$ limit the descent of the table H, and the flanges R R are adjusted to bring the table down to these stops at each vibration, in order that the lever $g$ may be lifted to a definite extent, and the required thickness given to each stave.

Having thus described my invention,

What I claim as my improvement, and desire to secure by Letters Patent, is—

1. Hinging or pivoting the vibrating feeding-table H in the manner described, and with relation to the saw, so that the staves may be sawed in the manner substantially as set forth.

2. The combination of cams Q, flanges R, and shaft O, with the table H, when constructed and arranged to operate in the manner and for the purpose set forth.

3. In combination with the flanged cams Q, table H, and stops $w\ w$, the adjustable stand $k$, for determining the thickness of the staves to be cut, substantially in the manner described.

CHARLES MURDOCK.

Witnesses:
C. I. SHIELDS,
WM. DENNIS.